No. 821,871.  
PATENTED MAY 29, 1906.  
D. B. HISLOP.  
CUSHIONED PNEUMATIC TIRE.  
APPLICATION FILED SEPT. 16, 1905.
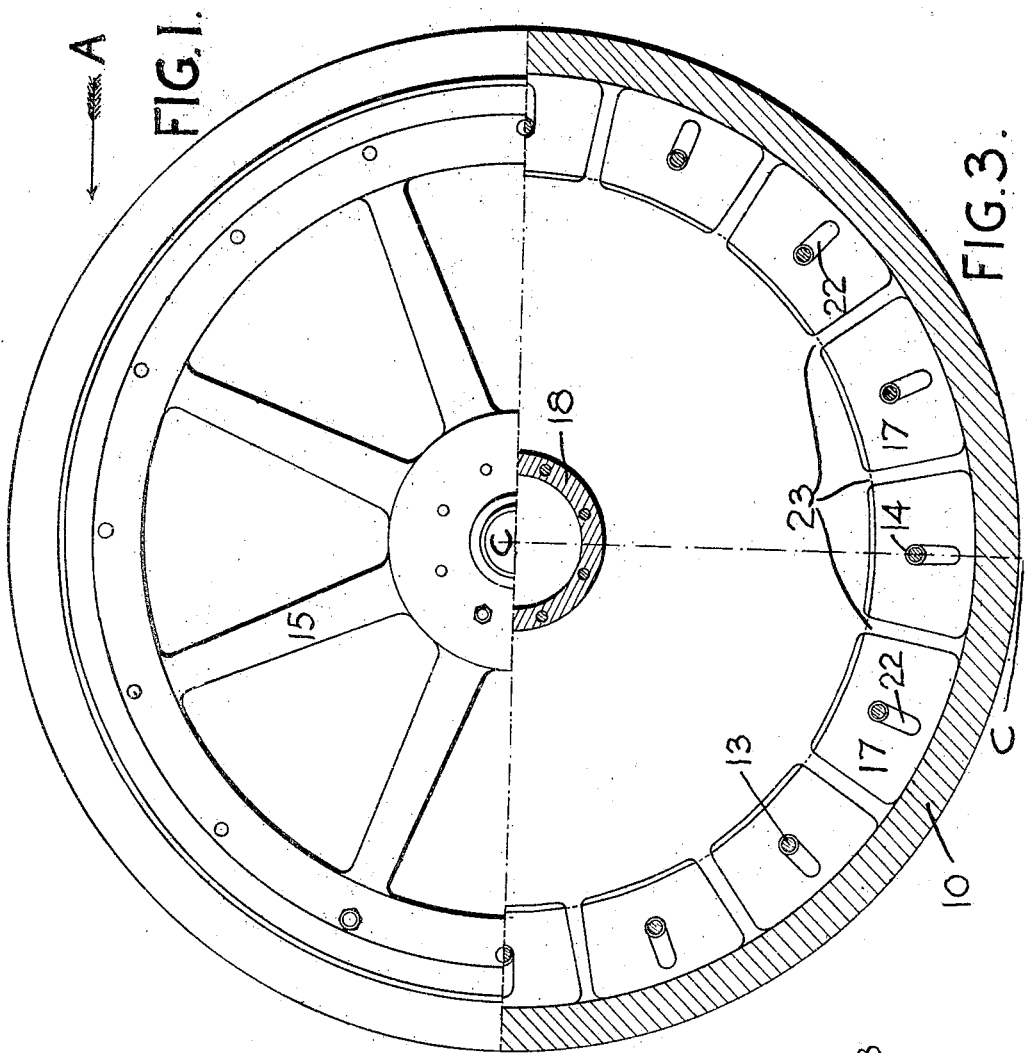
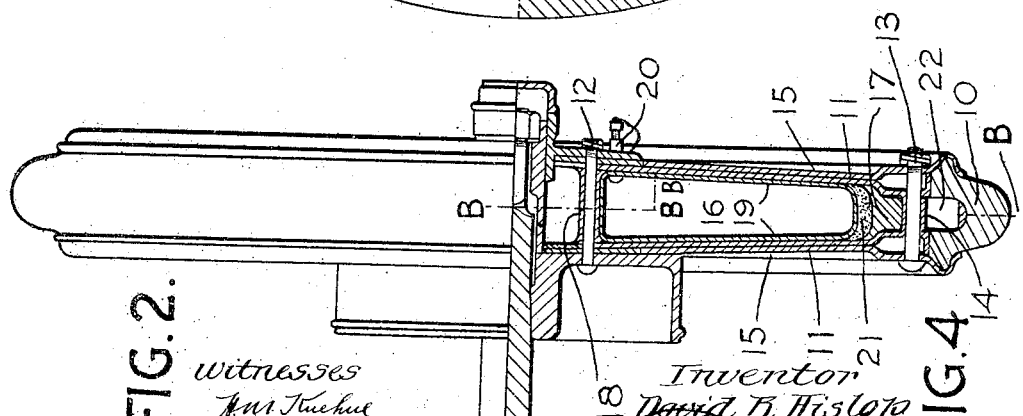

UNITED STATES PATENT OFFICE.

DAVID BLAIKIE HISLOP, OF ABERDEEN, SCOTLAND.

CUSHIONED PNEUMATIC TIRE.

No. 821,871.

Specification of Letters Patent.

Patented May 29, 1906.

Application filed September 16, 1905. Serial No. 278,829.

*To all whom it may concern:*

Be it known that I, DAVID BLAIKIE HISLOP, a subject of the King of Great Britain and Ireland, and a resident of Aberdeen, in the county of Aberdeen, Scotland, (whose post-office address is Littlejohn street, Metal Works, Aberdeen,) have invented a certain new and useful Improvement in and Relating to Cushioned Pneumatic Tires, for which I have applied for a patent in Great Britain, No. 20,144, bearing date September 19, 1904, of which the following is a specification.

This invention relates to cushioned pneumatic tires or wheels, the object being to provide tires which will not readily puncture, which will not distort, and which will be suitable for motor-cars, the vibration from road able being absorbed or diffused by an air-shock being absorbed or diffused by an air-chamber within the wheel, and in order that my said invention and the manner of performing or carrying the same into effect or practice may be properly understood I have hereunto appended an explanatory sheet of drawings, in which the same reference-numerals are used to indicate corresponding parts in all the figures where shown—that is to say:

Figure 1 is a part side elevation of a wheel constructed in accordance with my invention. Fig. 2 is a part elevation looking in the direction of the arrow A, Fig. 1. Fig. 3 is a part-sectional elevation at B B B B, Fig. 4. Fig. 4 is a part cross-sectional elevation at C C, Fig. 3.

In carrying out my invention I form the tread of the wheel of a thick ring 10 of molded rubber, which in itself forms the elastic cushion to some extent. In each side of the rubber ring is a disk of metal 11, these two disks forming part of or being attached to the hub of the wheel, bolts or studs 12 and 13 being used to bind the disks and the rubber ring together. In order that the disks when thus connected may not set up undue lateral pressure on the ring, distance-pieces 14—that is to say, ferrules—are threaded on the bolts between the disks. The disks of metal may be strengthened by radial arms 15 or radial corrugations, or they may be made more elastic by having concentric corrugations formed in them. Within the chamber 16, whose sides consists of the inner surfaces of the distance-blocks 17, the inner surfaces of the disks 11, and the ring 18 is a ring or bag 19 of rubber, which acts as an air-chamber, such bag being in connection with an air-valve 20, passing through the side of the disk. When the air-bag is inflated, metal distance-blocks 17, held in a groove in the ring of rubber forming the tread of the wheel, bear against the elastic cushion thus formed, 21 being a cushion of thickened tread of rubber vulcanized onto the other circumference of the bag 19 in order that wear and tear may be reduced. The transverse bolts 13 each pass through a distance-block 17, and so retains it in its place, although still allowing each separately to move radially for a distance determined by the slots 22. To keep the air-bag from adhering to the metal walls of its case, the two surfaces of the inside may be tinned or enameled or a piece of canvas or linen may be placed between the bag and the disk.

Between the metal distance-blocks 17 and the thickened tread 21 of the bag 19 a strip of rubbered canvas or other suitable material is placed to prevent any possibility of the blocks chafing the rubber bag.

The whole wheel is freely lubricated with French chalk.

The wheel performs its functions in the following manner: The bag 19 being inflated, it presses the blocks 17 radially outward. The block or blocks 17 which are nearest the ground are pressed inward with a force proportionate to the weight which is on the wheel, their amount of movement depending on the load on the wheel and the degree of inflation of the bag. The spaces 23 between the blocks become reduced according to their inward radial movement. As the wheel rotates each block in turn is pressed inward against the bag. By the combination of the bag 19, blocks 17, and tire 10 there is provided a tire which cannot puncture and can run perfectly well as a solid tire if deflated, obviating any danger of total disablement and stoppage on the road. It has all the elasticity of an ordinary pneumatic tire.

Having now described my invention, what I claim as new, and desire to secure by Letters Patent, is—

A wheel comprising a hub, side members secured thereto, an elastic cushion 10 gripped between the outer edges of said members, bolts 13 adjacent the outer edges of said members for holding the members in gripping relation with the cushion, a plurality of blocks having slots therein through which the bolts pass, said blocks lying between the members, an annular inflatable bag arranged between the side members and the hub and blocks and a cushion 21 between the outer edge of said bag and the inner edges of the blocks, said blocks being arranged with a space between their adjacent edges.

In witness whereof I have hereunto set my hand, in presence of two witnesses, this 31st day of August, 1905.

DAVID BLAIKIE HISLOP.

Witnesses:
 JAMES WALKER,
 HENRY A. B. NAVELL.